Nov. 25, 1958  V. C. MOORE  2,861,474
SPLIT TORQUE CONVERTER TRANSMISSION
Filed July 25, 1957  2 Sheets-Sheet 2

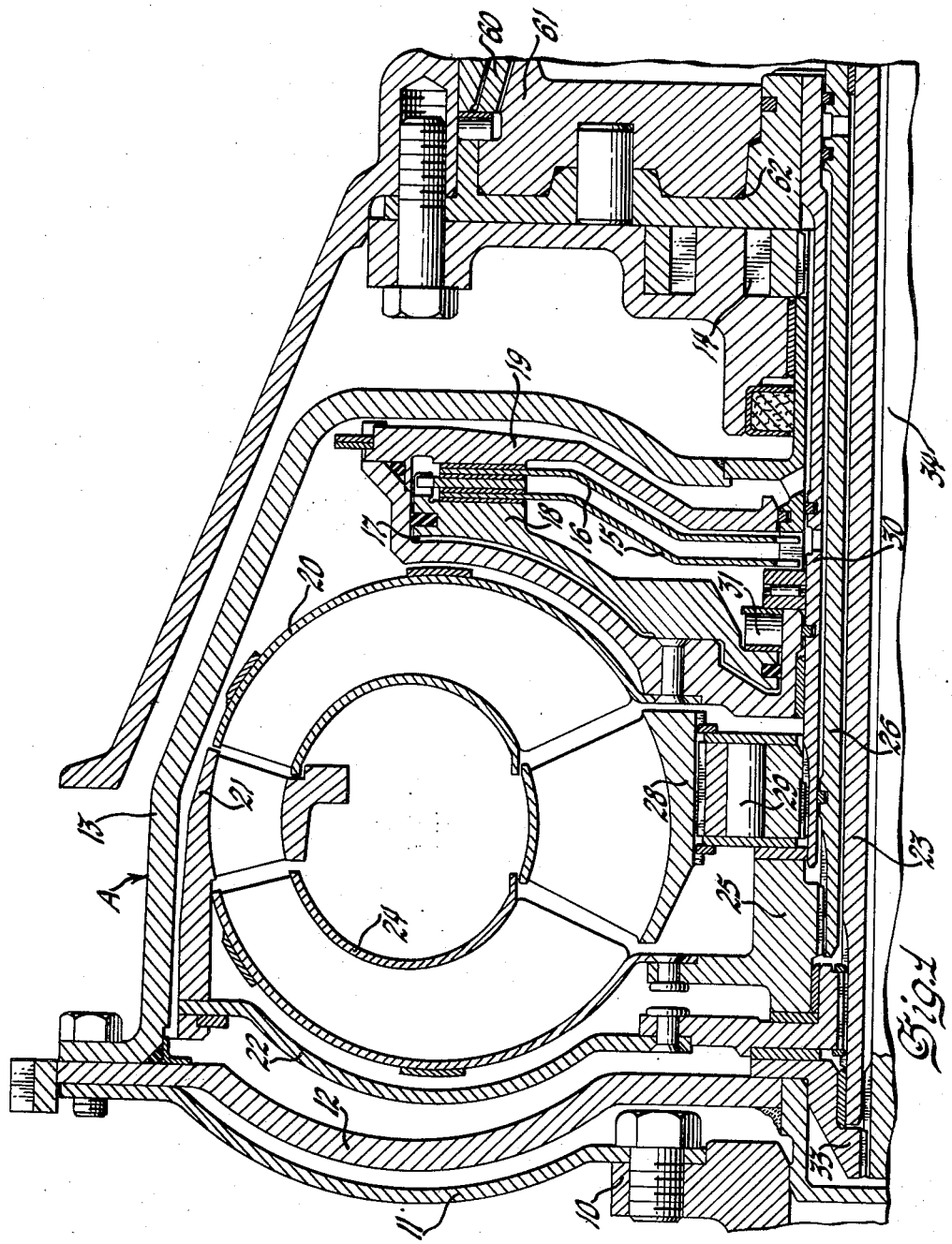

INVENTOR.
Victor C. Moore
BY
W. C. Middleton
ATTORNEY.

United States Patent Office 2,861,474
Patented Nov. 25, 1958

2,861,474

SPLIT TORQUE CONVERTER TRANSMISSION

Victor C. Moore, Plymouth, Mich., assignor to General Motors Corporation, Detroit, Mich., a corporation of Delaware Application July 25, 1957, Serial No. 674,156

10 Claims. (Cl. 74—677)

This invention relates to transmissions and more particularly to a transmission incorporating two hydrodynamic torque transmitting devices and planetary gearing wherein the planetary gearing is located physically and functionally between the two hydrodynamic torque transmitting devices.

An object of this invention is to provide a plural speed ratio transmission incorporating planetary gearing and a pair of hydrodynamic torque transfer members for transmitting torque from a power input to a power output shaft in a smooth and efficient manner.

Another object of this invention is to provide a transmission including a hydrodynamic torque converter having a pair of turbines, connected to drive different elements of different planetary gearing units, respectively, together with a fluid coupling for determining the drive ratio of one of the gearing units.

An additional object of this invention is to provide a transmission having a pair of planetary gearing units wherein the planet carriers of the gearing units are connected to each other to rotate as a unit and to the power output shaft.

A further object of this invention is to provide in a transmission of the class described, a driver operable brake mechanism selectively operable to provide reduction drive in one planetary gearing unit and to brake the turbine of a fluid coupling against rotation to obtain maximum engine and hydrodynamic vehicle braking when desired.

Another object of this invention is to provide a pair of one-way brakes having a common releasable ground brake for releasing both one-way brakes when desired.

These and other objects and advantages of this invention will be apparent from the following description and claims taken in conjunction with the accompanying drawings in which:

Figure 1 is a transverse sectional view of the front portion of the transmission.

Figure 1A:
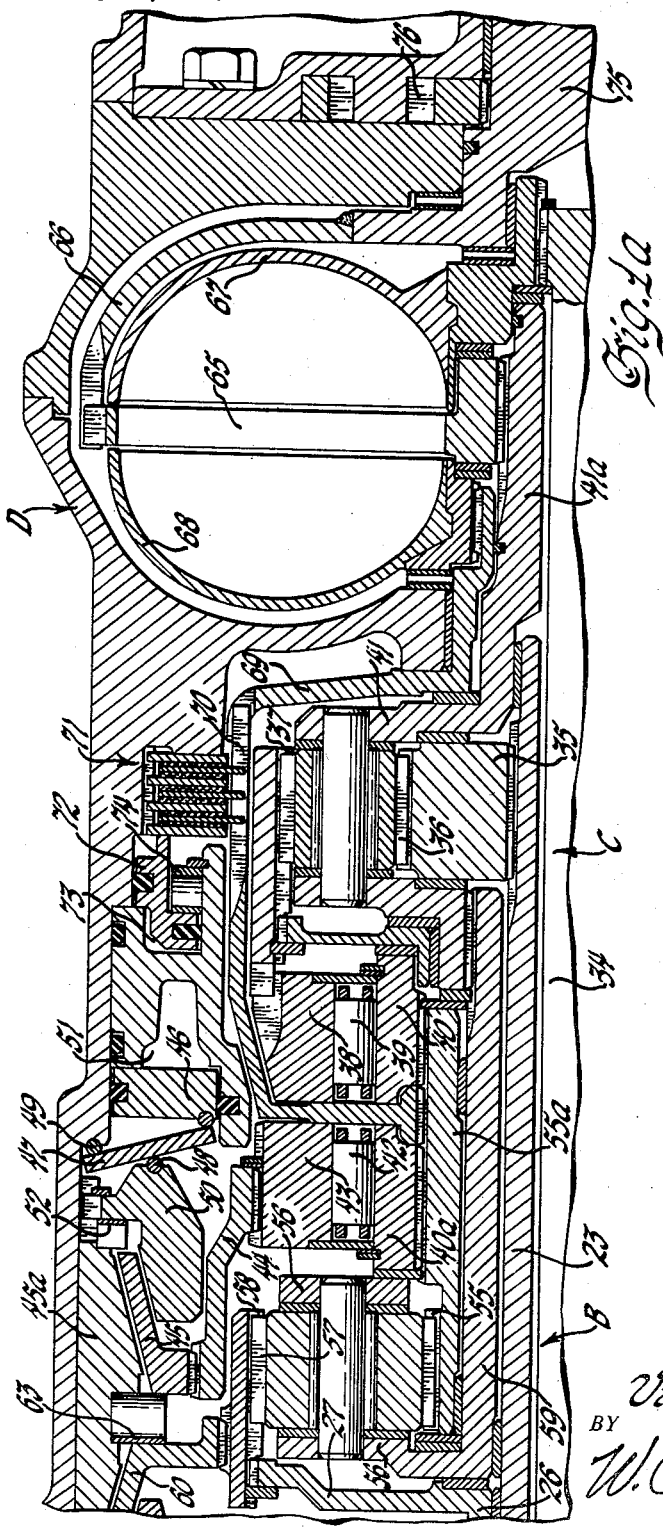
Figure 1A is a transverse sectional view of the rear portion of the transmission.

Referring to the drawings, there is shown a hydraulic torque converter A, a pair of planetary gearing units B and C, and a fluid coupling unit D arranged from front to rear of the transmission in the order named. Torque converter unit A includes a drive disc 11 connected to an engine driven shaft 10 and to flywheel 12 and torus cover 13. Torus cover 13 is thus rotated whenever the engine operates to drive a pump 14. A neutral clutch represented by a pair of clutch plates 15 and 16 may be applied or released to connect and disconnect an impeller 20 to and from member 13 through a housing 19. The clutch may be constructed of any suitable number of clutch plates as required to adequately handle the torque to be transmitted therethrough and need not be limited to a pair of clutch plates as shown. Fluid pressure may be applied to a chamber 17 behind a piston 18 to engage the neutral clutch to drive impeller 20 at engine speed. A first turbine 21 is connected by means of a drive flange 22 to a hollow sleeve shaft 23 which carries a sun gear 35 of a planetary gearing unit C. A second turbine 24 is connected to a hollow sleeve shaft 26 by means of a hub member 25. A ring gear 58 of planetary gear unit B is connected to hollow sleeve shaft 26 by means of a drive plate 27. A reaction member 28 is held against reverse rotation by means of a one-way brake 29 positioned between reaction member 28 and a ground sleeve 30, fixed against rotation. One way brake 29 will permit the stator 28 to rotate forwardly when the speed of rotation of turbine 24 approaches that of impeller 20. A clutch release spring 31 yieldingly biases piston 18 to release the clutch plates 15 and 16 whenever fluid pressure is released from chamber 17. A shaft 34 is connected to rotate with flywheel 12 by means of a hub 33 splined to shift 34. Sun gear 35 of gear unit C drives planet gears 36 which mesh therewith and with a ring gear 37. An annular race member 38 fixed to ring gear 37 cooperates with a one-way brake unit 39 such as a sprag brake; the brake unit 39 cooperating in turn with a brake hub 40. Planet carrier 41 of gearing unit C constitutes the output member of the gearing unit. Brake hub 40 cooperates with a second sprag brake unit 42, the race member 43 of which may be held against rotation by means of drum 44 and cone brake 45. The cone brake 45 is splined to drum 44 for slight axial movement, but the cone, drum and race 43 are non-rotatable with respect to each other. A piston 46 may actuate a Belleville washer 47 supported upon pivot points 48 and 49 to force an actuator 50 against cone brake 45 when fluid under pressure is admitted to chamber 51. A release spring 52 functions to release actuator 50 from cone member 45 when fluid pressure is released from chamber 51.

Sun gear 55 of planetary unit B is provided with an extension 55a, splined to members 40 and 40a. Planet carrier 56 carries a plurality of planet gears 57 in mesh with sun gear 55 and ring gear 58. Planet carriers 56 and 41 are secured to each other by a sleeve 59 splined to carrier 41. A reverse brake 60 splined to ring gear 58 may be applied to a piston 61 to prevent rotation of ring gear 58 when fluid pressure is admitted to chamber 62. A spring 63 biases cone brake 60 to release when fluid pressure is exhausted from chamber 62. Planet carrier 41 is connected to a drive shaft 75 by means of an extension 41a, a spider 65 extending the fluid coupling C, and a drum 66. An impeller 67 is splined to and rotated by shaft 34. A turbine 68 is connected to the sun gear 55 by means of a drive plate 69 and a drum 70. A disc brake 71 may be applied to prevent rotation of sun gear 55 and turbine 68. A piston 72 responsive to fluid pressure in chamber 73 will apply disc brake 71 when fluid pressure is admitted to chamber 73. A release spring 74 yieldably biases piston 72 to release the disc brake 71 when fluid pressure is exhausted from chamber 73. Output shaft 75 may drive a pump 76 when the vehicle is in motion.

*Operation—neutral*

For positive neutral, neutral clutch 15—16 and forward brake 45 are released. In this condition of operation, impeller 20 will be released from drum 13 and will note rotate. With forward brake 45 released, there is no ground reaction point for either one-way brake 39 or one-way brake 42. It will be understood therefore that neither ring gear 37 nor sun gear 55 will be held against rotation, and no torque can be transmitted through either planetary gearing unit. It this condition of operation, the vehicle engine may be speeded up or raced for quick engine warm up, for example, without driving the vehicle.

3

*Forward—low*

To provide forward drive, clutch 15—16 and forward brake 45 are engaged. With the vehicle standing still fluid coupling unit D is initially empty of hydraulic working fluid. The engine may idle without driving the vehicle due to slip in the torque converter. To propel the vehicle, the engine is speeded up to rotate impeller 20 at sufficient speed such that turbine 21 will rotate sun gear 35 of planetary gearing unit C. Ring gear 37 is held against reverse rotation by means of one-way brake 39. The reaction torque is grounded to the transmission case through members 38, 39, 40, 55a, 40a, 42, 43, 44 and 45. Initial drive is in reduction of gear unit C and the torque multiplication of torque converter A. It will be noted that in this phase of operation the turbine 24 is initially driven through planetary gear unit B. Since the two planet carriers 41 and 56 are fixed to each other to rotate as a unit, and since sun gear 55 is held against reverse rotation by means of one-way brake 42, ring gear 58 and turbine 24 are caused to rotate faster than planet carrier 56, the relative speeds of rotation being determined by the drive ratio of the gear unit B.

*Forward—second*

As the speed of rotation of turbine 24 increases, turbine 24 gradually and smoothly picks up the load and begins to drive ring gear 58. The drive of the planet carrier 41 is gradually and smoothly taken on through gear unit B rather than gear unit C. When this occurs, one-way brake 39 will release. This transition from first to second speed drive ratio is extremely smooth in nature. It will be understood that in second gear drive ratio, sun gear 55 is held against reverse rotation by means of members 55a, 40a, one-way brake 42, members 43, 44, 45 and conical brake member 45a.

*Direct drive*

The transition from second speed to direct drive is accomplished by locking up gear unit B. This is done by admitting working fluid to fluid coupling D. Assuming that coupling D is filled with fluid, turbine 68 will be driven by impeller 67. Since turbine 68 is connected to sun gear 55 to rotate as a unit therewith, sun gear 55 is driven at substantially engine shaft speed. Ring gear 58 likewise is driven at substantially engine shaft speed by turbine 24. Gear unit B, therefore, drives output shaft 75 in direct drive.

*Coast brake*

In normal forward drive engine braking is available whenever the vehicle tends to overrun the engine, provided that the transmission is in direct drive. If the fluid coupling unit D is empty of fluid, freewheeling obtains. In order to provide maximum braking to conserve the vehicle brakes as in descending a long grade, brake unit 71 may be applied to prevent rotation of sun gear 55 and turbine 68. Such action automatically places gear unit B in reduction drive to increase the engine braking over that obtainable in direct drive and in addition, by stopping rotation of turbine 68 causes fluid coupling D to act as a hydrodynamic brake. The brake 71 when applied, causes gear unit B to drive the engine shaft 10 and shaft 34 at a speed faster than that of shaft 75. This gives maximum engine braking plus maximum hydrodynamic braking in coupling D.

*Reverse*

To obtain reverse drive of the vehicle, reverse brake 60 is applied to prevent rotation of ring gear 58. Forward brake 45 and coast brake 71 are released. Turbine 21 drives sun gear 35. Due to the load on planet carrier 41, the carrier tends to remain stationary so that ring gear 37 is driven reversely to the direction of rotation of sun gear 35. Ring gear 37 drives sun gear 55 through one way clutch 39, member 40 and extension 55a. Ring gear 58 is the reaction member of gear unit B so that planet carrier 56 is driven reversely in reduction.

Suitable valving, not shown, may be employed to control the admission of fluid under pressure to an exhaust of pressure from servo chambers 17, 62, 51, 73 and to fluid coupling D. Such valving may be adapted to be manually controlled by the vehicle operator, but in the case of fluid coupling D it is desirable that the valving be controlled by means of a speed responsive governor and the vehicle accelerator pedal such that upshifts and downshifts may occur as a result of change of vehicle speed with the accelerator pedal acting as an overcontrol to give a forced downshift for rapid acceleration by positioning the valve which controls admission of fluid to the coupling to dump the coupling when the driver so desires. While the method of admitting and exhausting fluid from coupling unit D is not shown, dump and fill couplings per se are well known in the art. Accordingly it is not deemed necessary to illustrate the passages for admitting and exhausting fluid from the coupling.

What is claimed is:

1. In a transmission, in combination, a first hydrodynamic torque transfer device having an impeller adapted to be driven by a power input shaft and a pair of turbine members, first and second planetary gearing units, a second hydrodynamic torque transfer device having an impeller and a turbine, a power output shaft, means connecting one element of said first gearing unit to one of said turbine members of said first-mentioned torque transfer device, means for braking a second member of said first planetary gearing unit against rotation in one direction, means connecting a third member of said first planetary gearing unit to said output shaft, means connecting the second of said pair of turbine members to one element of said second planetary gearing unit, means for braking a second member of said second planetary gearing unit against rotation in one direction, means connecting a third element of said second planetary gearing unit to said third element of said first planetary gearing unit, means connecting the turbine of said second mentioned hydraulic torque transfer device to said second element of said second planetary gearing unit, and means connecting said impeller of said second hydraulic torque transfer device to said power input shaft.

2. In a transmission, a first hydraulic torque transfer device having an impeller driven by a power input shaft and a pair of turbines, first and second planetary gearing units, a second hydraulic torque transfer device having an impeller and a turbine, a power output shaft, means connecting one element of said first gearing unit to one of said pair of turbines, means for braking a second element of said first gearing unit against rotation in one direction, means connecting a third element of said first gearing unit to said output shaft, means connecting a second of said pair of turbines to one element of said second gearing unit, means for braking a second element of said second gearing unit against rotation in one direction, means connecting a third element of said second gearing unit to said third element of said first gearing unit, means connecting the turbine of said second hydraulic torque transfer device to said second element of said second gearing unit, selectively operable means for preventing rotation of said second element of said second gearing unit in two directions, and means connecting the impeller of said second hydraulic torque transfer device to said power input shaft.

3. In a transmission, in combination, a first hydraulic torque transfer device having an impeller driven by a power input shaft and a pair of turbines, first and second planetary gearing units, a second hydraulic torque transfer device having an impeller and a turbine, a power output shaft, means connecting one element of said first planetary gearing unit to one of said pair of turbines, one-way brake means for braking a second member of said first planetary gearing unit against rotation in one direction, means connecting a third element of said first planetary gearing unit to said output shaft, means connecting the second of said pair of turbines to one element of said second planetary gearing unit, one-way brake means for braking a second element of said second planetary gearing unit against rotation in one direction, means connecting a third element of said second planetary gearing unit to said third element of said first planetary gearing unit, means connecting the turbine of said second hydraulic torque transfer device to said second element of said second planetary gearing unit, a selectively operable brake for preventing rotation of said last-mentioned turbine and said second element of said second planetary gearing unit in two directions, and means connecting the impeller of said second hydraulic torque transfer device to said power input shaft.

4. In a transmission, a hydraulic torque converter having an impeller adapted to be driven by a power input shaft, a pair of turbine members and a reaction member, first and second planetary gearing units, a fluid coupling having an impeller and a turbine, a power output shaft, means connecting one element of said first planetary gearing unit to one of said torque converter turbines, one-way brake means for preventing rotation of a second element of said first planetary gearing unit in one direction, means connecting a third element of said first planetary gearing unit to said power output shaft, means connecting the second of said pair of torque converter turbines to one element of said second gearing unit, one-way brake means for preventing rotation of a second element of said second gearing unit in one direction, means connecting a third element of said second gearing unit to said third element of said first gearing unit, means connecting said fluid coupling turbine to said second element of said second gear unit, and means connecting said fluid coupling impeller to said power input shaft.

5. In a transmission, a hydraulic torque converter having an impeller adapted to be driven by a power input shaft, a pair of turbines and a reaction member, first and second planetary gear units, a fluid coupling having an impeller and a turbine, a power output shaft, a drive connection between one of said torque converter turbines and one element of said first planetary gearing unit, means including a pair of one-way brakes for preventing rotation of a second element of said first planetary gear unit in one direction, a drive connection between a third element of said first gear unit and said output shaft, a drive connection between the second of said pair of torque converter turbines and one element of said second planetary gear unit, means including one of said pair of one-way brakes for preventing rotation of a second element of said second gear unit in one direction, a drive connection between said fluid coupling turbine and said second element of said second gear unit, a drive connection between a third element of said second gear unit and said third element of said first gear unit, a drive connection between said fluid coupling impeller and said power input shaft, and a selectively operable two-way brake for preventing rotation of said fluid coupling turbine and said second element of said second gear unit.

6. In a transmission, in combination, a first hydraulic torque transfer device having an impeller adapted to be driven by a power input shaft and a pair of turbine members, first and second planetary gearing units, each of said gearing units having a planet carrier supporting planet gears in mesh with a sun gear and a ring gear, respectively, a second hydraulic torque transfer device having an impeller and a turbine, a power output shaft, a drive connection between one of said pair of turbines and the sun gear of said first gear unit, means including a pair of one-way brakes for preventing rotation of said first gear unit ring gear in one direction, a drive connection between said first gear unit planet carrier and said output shaft, a drive connection between the second of said pair of turbines and said second gear unit ring gear, means including one of said pair of one-way brakes for preventing rotation of said second-gear unit sun gear in one direction, a drive connection between said first and second gear unit planet carriers, a drive connection between the turbine of said second hydraulic torque transfer device and said second gear unit sun gear, and a drive connection between the impeller of said second hydraulic torque transfer device and said power input shaft.

7. In a transmission, in combination, a first hydraulic torque transfer device having an impeller adapted to be driven by a power input shaft and a pair of turbine members, first and second planetary gearing units each having a planet carrier supporting planet gears in mesh with a ring gear and a sun gear, respectively, a power output shaft, means connecting said planet carriers to each other and to said output shaft whereby said planet carriers and output shaft rotate as a unit, a second hydrodynamic torque transfer device having an impeller and a turbine, a drive connection between one of said pair of turbines and the sun gear of said first planetary gearing unit, one-way brake means for preventing rotation of said first gear unit ring gear in one direction, a drive connection between the second of said pair of turbine members and said second gear unit ring gear, means connecting said second gear unit sun gear to the turbine of said second hydraulic torque transfer device for rotation as a unit, one-way brake means for preventing rotation of said last-mentioned sun gear and turbine in one direction, two-way brake means selectively operable to prevent rotation of said last-mentioned sun gear and turbine in any direction, and a drive connection between the impeller of said second hydraulic torque transfer device and said power input shaft.

8. In a transmission, a first hydraulic torque transfer device having an impeller driven by a power input shaft and a pair of turbines, first and second planetary gearing units, a second hydraulic torque transfer device having an impeller and a turbine, a power output shaft, means connecting one element of said first gearing unit to one of said pair of turbines, means for braking a second element of said first gearing unit against rotation in one direction including a pair of one-way brakes, means connecting a third element of said first gearing unit to said output shaft, means connecting the second of said pair of turbines to one element of said second gearing unit, means including one of said pair of one-way brakes for braking a second element of said second gearing unit against rotation in one direction, a driver controllable brake for selectively rendering both of said one-way brakes inoperable, means connecting a third element of said second gearing unit to said third element of said first gearing unit, means connecting the turbine of said second hydraulic torque transfer device to said second element of said second gearing unit, selectively operable brake means for preventing rotation of said turbine and said second element of said second gearing unit, and means connecting the impeller of said second hydraulic torque transfer device to said power input shaft.

9. In a transmission, a hydraulic torque converter having an impeller adapted to be driven by a power input shaft, a pair of turbines and a reaction member, clutch means for connecting said impeller to said input shaft, a fluid coupling having an impeller and turbine, a first planetary gearing unit positioned between said torque converter and fluid coupling, a second planetary gearing unit positioned between said first gearing unit and said hydraulic torque converter, a power output shaft, a drive connection between one of said torque converter turbines and one element of said first planetary gearing unit, means including a pair of one-way brakes for preventing rotation of a second element of said first planetary gearing unit in one direction, means connecting a third element of said first planetary gearing unit to said output shaft, a drive connection between the second of said pair of torque converter turbines and one element of said second planetary gearing unit, means including one of said pair of one-way brakes for preventing rotation of a second element of said second gear unit in one direction, selectively operable means for rendering both of said one-way brakes ineffective, a drive connection between said fluid coupling turbine and said second element of said second gearing unit, a drive connection between a third element of said second gearing unit and said third element of said first gearing unit, a drive connection between said fluid coupling impeller and said power input shaft, and a selectively operable two-way brake for preventing rotation of said fluid coupling turbine and said second element of said second gear unit.

10. In a transmission, a hydraulic torque converter having an impeller driven by a power input shaft, a pair of turbines and a reaction member, first and second planetary gearing units each having a planet carrier supporting planet gears in mesh with a ring gear and a sun gear, respectively, a fluid coupling having an impeller and a turbine, a power output shaft, a drive connection between one of said pair of torque converter turbines and the sun gear of said first gearing unit, means including a pair of one-way brakes for preventing rotation of said first gear unit ring gear in one direction, means connecting said first gear unit carrier to said output shaft, a drive connection between the second of said torque converter turbines and said second gear unit ring gear, means including one of said pair of one-way brakes for preventing rotation of said second gear unit sun gear in one direction, a drive connection between said fluid coupling turbine and said second gear unit sun gear, a drive connection between said first and second gear unit planet carriers, a selectively operable two-way brake for preventing rotation of said fluid coupling turbine and said second gear unit sun gear, selectively operable means for rendering both of said one-way brakes ineffective, and a drive connection between said fluid coupling impeller and said power input shaft.

No references cited.